INFORMATION HANDLING APPARATUS

Filed Dec. 29, 1964 2 Sheets-Sheet 1

INVENTORS
ROBERT R. LEONARD
EDWARD G. FASSINO
JAMES F. BEATTY
BY Fred Jacob
ATTORNEY INVENTORS
ROBERT R. LEONARD
EDWARD G. FASSINO
JAMES F. BEATTY
BY Fred Jacob
ATTORNEY United States Patent Office 3,356,995

Patented Dec. 5, 1967

3,356,995

INFORMATION HANDLING APPARATUS

Robert R. Leonard, Dover, Edward G. Fassino, Natick, and James F. Beatty, Westwood, Mass., assignors to Honeywell Inc., a corporation of Delaware Filed Dec. 29, 1964, Ser. No. 421,921
11 Claims. (Cl. 340—172.5)

ABSTRACT OF THE DISCLOSURE

A magnetic core memory system having digital signal conversion circuitry capable of establishing a value of core switching current which varies in accordance with the number of cores to be switched in magnetic state.

The present invention relates in general to digital data storage apparatus and, more particularly, to a magnetic core memory stystem of improved performance.

In digital data processing equipment, it is often desirable to store a plurality of units of binary information in a magnetic core memory array. The individual cores within such an array are arranged in a multiplane matrix configuration having individual cores threaded by coordinate drive wires. To store binary information within the memory cores, it is necessary to couple switching pulses of the proper amplitude and polarity to those drive wires which thread the cores.

The magnetic cores in systems which are to operate at high speeds, or read-write cycles, are frequently grouped by characters, or words, where those cores which occupy a similar position in each plane of the matrix are threaded by a common drive wire, commonly called a word line. In such a linear select memory, each plane in the matrix represents a digit location of the binary coded word represented by all the cores threaded by a word line. The word is read out of the memory by applying a current pulse to the word line during the read cycle, sufficient to switch the threaded cores.

During the write cycle, an unbalanced current technique is usually used for storing binary information in the memory. The selected word line, for example, may receive approximately two-thirds of the necessary core switching current, while the cores in each digit plane which are to be switched to a binary one level, receive the necessary additional one-third switching current via their respective digit lines. In such magnetic core memory arrays, it has been found that the effective write current, i.e., the current that actually passes through the cores and which is effective to switch the latter, varies in accordance with the number of cores in the word line that are to be simultaneously switched to the binary one state. Such variations in the value of the switching current applied to the cores because of changes in the number of cores switched, result in a change in the amount of flux established within the switched cores. As a consequence, variable amplitude binary one output signals are derived from the cores upon read-out.

One solution to this problem has been to utilize pulse generators which are designed to deliver a constant value of current independently of the impedance presented to the current generator by its magnetic core load. While such constant current pulse generators have somewhat improved the operation of memory systems, they have still proven to be inadequate in many applications. This stems from the fact that, while a constant current generator is capable of delivering a pulse whose amplitude is independent of the load impedance, the switching current which actually flows through the cores still varies in accordance with the number of cores to be switched, the variation being due to the presence of shunt capacitance between the memory core lines and ground. Consequently, it has been found, for example, that binary one digit stored in a common word in a linear select memory array together with fifty-five other binary one digits, provides a binary one signal upon read-out which is forty percent lower in amplitude than that observed when the same binary one digit is written with fifty-five binary zero digits in the word.

It is, therefore, an object of the present invention to provide a linear select magnetic core memory system which is capable of providing a constant value of effective switching current to the magnetic cores in a selected memory word line.

It is another object of the present invention to provide a magnetic core memory system capable of establishing a value of core switching current which increases in accordance with the number of cores in the memory to be switched to the binary one state.

Still another object of the present invention is to provide a memory system having memory element switching circuitry adapted to provide pulses whose amplitudes change to compensate for variations otherwise encountered in the read-out signals from the switched elements.

In the present invention, the multi-digit word to be stored in the magnetic core memory is first coupled to the input leads of a digital-to-analog converter. The converter forms an output signal whose amplitude is a function of the number of applied binary digits which are at a binary one level. This proportional output signal is then used to control the value of current provided by the word current generator which activates the selected memory word line. This compensated value of word current, together with a fixed value of digit current, establishes a flux field of constant magnitude in the switched cores. Thus, upon read-out of the word from the memory, the binary one signals are of a constant amplitude which is independent of the binary one content of the word.

The foregoing objects and features of novelty which characterize the invention as well as other objects of the invention are pointed out with particularity in the claims annexed to and forming a part of the present specification. For a better understanding of the invention, its advantages, and specific objects obtained with its use, reference should be had to the accompanying drawings and descriptive matter, in which there is illustrated and described a preferred embodiment of the present invention.

Figure 1:
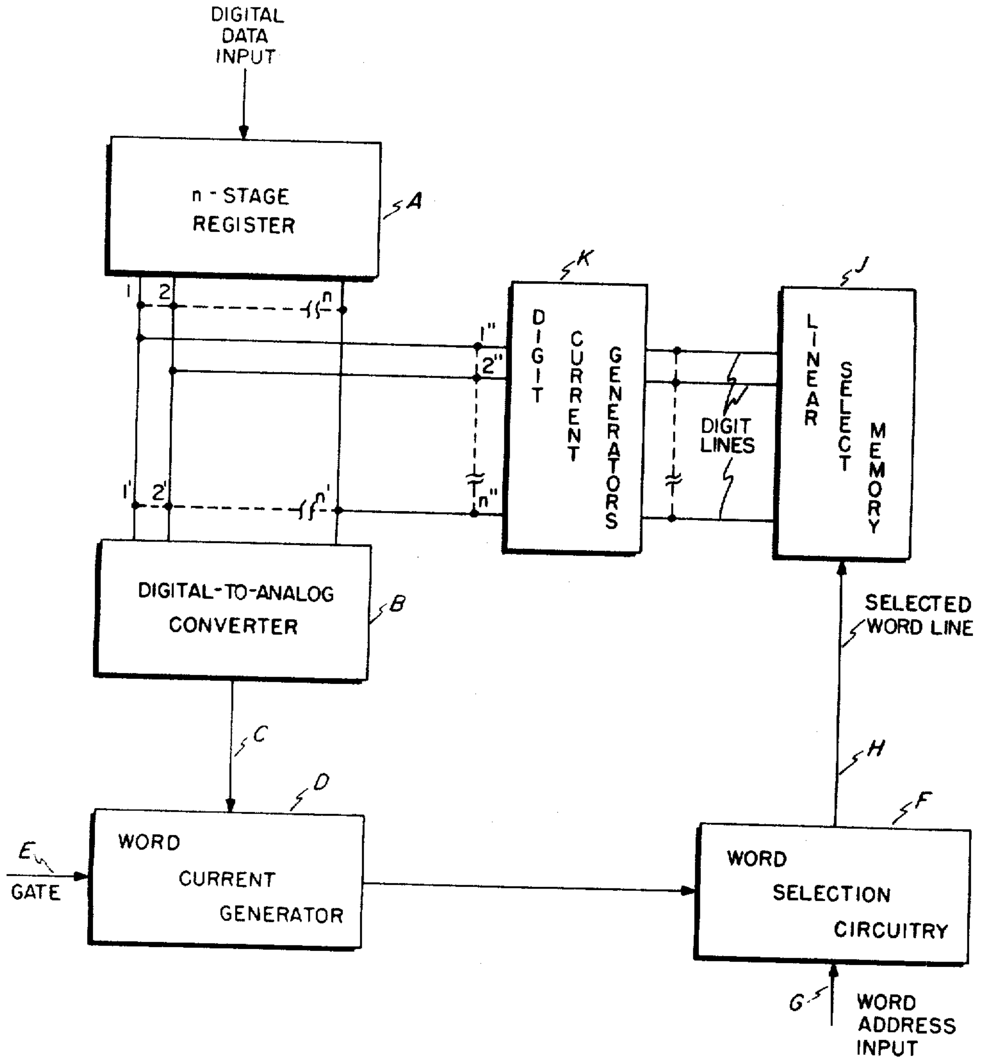
FIGURE 1 illustrates a block diagram representation of a preferred embodiment of the present invention.

Referring now to FIGURE 1 of the drawings, there is shown, in block diagram form, a multistage register A which is adapted to receive, and temporarily store, $n$ consecutively ordered binary digits which together comprise a binary character or word. The register A may be of conventional design, and may, for example, consist of $n$ transistorized flip-flop stages adapted to be responsive to either the parallel or serial flow of input data. The ordered binary digit storage stages within the register A have like-ordered output terminals 1, 2 . . . $n$, which are coupled to the related input terminals 1', 2' . . . $n'$ of a digital-to-analog converter B.

The digital-to-analog converter B is adapted to form on its single output lead C, an analog control signal whose amplitude is dependent upon the number of digital input signals applied to the converter B which are at a binary one level. The analog signal on the lead C is coupled to control circuitry within the word current generator D, to control the amplitude of the current pulse generated by the latter upon activation of its gate lead E. The word current pulse derived from the generator D is thereafter routed through word selection circuitry F in accordance with address location information applied to the selection circuitry via its lead G. The word selection circuitry is usually, but not necessarily, formed of diode gating structure adapted to locate a specific word line H within a word-organized, or linear select memory J.

The binary digits temporarily stored in the register A are also coupled to a plurality of digit current generators K, adapted to couple to their respective memory digit input lines a partial switching current of a fixed magnitude. Those cores which concurrently receive a compensated value of word current, as well as a fixed value of digit current, will be switched to the binary one state and will, during a subsequent read-out operation, provide binary one read-out pulses of a fixed amplitude.

Figure 2A:
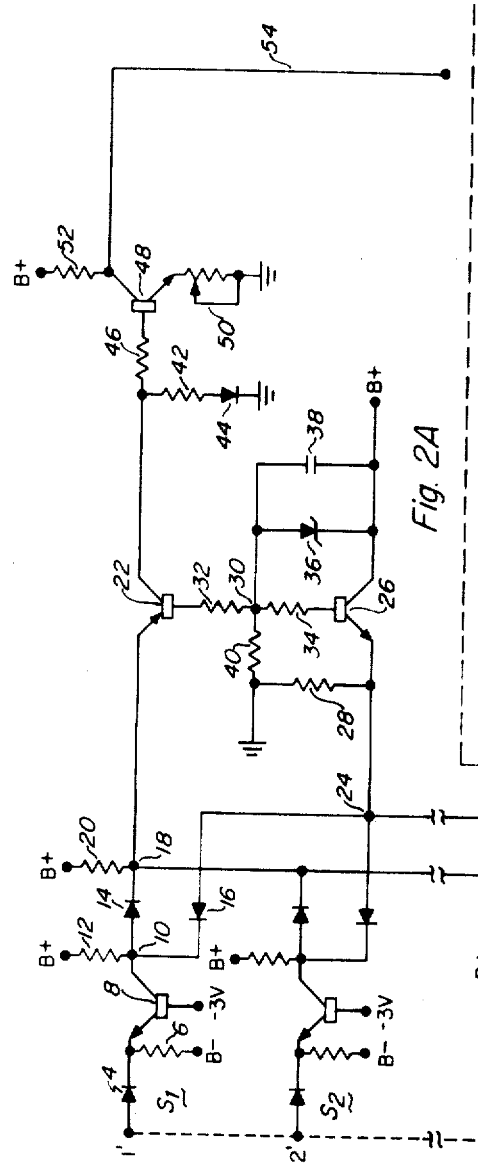
FIGURE 2A illustrates a preferred embodiment of the digital-to-analog converter of the present invention.

FIGURE 2A of the drawings shows in schematic form a preferred embodiment of the digital-to-analog converter B of FIGURE 1. Specifically, FIGURE 2A shows a digital-to-analog converter with a number of digit input stages $S_1$, $S_2$ . . . $S_n$, having input terminals 1′, 2′ . . . *n*′ respectively. Each of the input terminals is adapted to receive one of the *n* digits of a binary word to be subsequently stored in a magnetic core memory array. Since each of the input stages is identical in construction and in operation, only the elements associated with the input stage $S_1$ have been given element reference indicia, and only the operation of the input stage $S_1$ will be described in detail.

The input stage $S_1$ has a diode 4 whose anode is connected to the digit input terminal 1′, and whose cathode is connected to one lead of a resistor 6 and to the emitter of a transistor 8. The other lead of resistor 6 is returned to a negative biasing source B−. The base of transistor 8 is returned to a −3 volt DC biasing source, while the collector of transistor 8 is connected to the junction 10 which further joins one lead of a resistor 12, the anode of a diode 14, and the cathode of a diode 16. The other lead of resistor 12 is connected to a positive biasing source B+. The converter shown in FIGURE 2A was operated with B− and B+ voltage values of minus 30 and plus 34 volts DC respectively.

The cathode of diode 14 of stage $S_1$, as well as its counterpart in each of the other input stages, is connected to a junction 18, which further connects one lead of the resistor 20 and the emitter of a transistor 22. The other lead of resistor 20 is connected to the aforementioned B+ source. The anode of the diode 16 of stage $S_1$, as well as its counterpart in each of the other input stages, is connected to a junction 24, which further connects the emitter of a transistor 26 and one lead of a resistor 28, the latter being returned to ground. The transistors 22 and 26 each have their base leads coupled to a junction 30 via low ohmic value parasitic oscillation suppressor resistors 32 and 34 respectively.

The collector of transistor 26 is returned to B+ potential as is the cathode of a zener diode 36 and one lead of a condenser 38. The other lead of condenser 38 and the anode of the zener diode 36 are each coupled to the junction 30 to provide at the junction 30 a voltage of constant value with respect to the B+ potential. The zener diode 36 was selected to establish a voltage of +12 volts at the junction 30. The resistor 40 connected between the junction 30 and ground provides a continuous current path for the zener diode 36 to sustain the latter in its avalanche region.

A series-connected resistor 42 and a diode 44 are connected between ground and the collector of transistor 22. The collector of transistor 22 is coupled via a low ohmic value parasitic oscillation suppressor resistor 46 to the base of a transistor 48, the latter having its emitter coupled to ground by way of an adjustable resistor 50. The collector of transistor 48 is coupled via the resistor 52 to the B+ potential and to the output lead 54 of the converter.

Considering now the operation of the converter apparatus of FIGURE 2A, it will be assumed that binary zero signals applied to the converter are signals of approximately −5 volts, while binary one signals are signals approaching ground potential. If a converter input terminal, such as the input terminal 1′ of input stage $S_1$ receives a binary zero signal, its associated input transistor 8 will become conductive. This is the case since there will exist a forward biasing potential across its base-emitter junction. The collector-emitter current flowing through the transistor 8 will be furnished by way of a pair of current paths. One path includes the resistor 12 and the B+ source while the other path includes the current through the diode 16, the latter having a positive potential of approximately 12 volts maintained at its anode terminal by the action of the emitter follower transistor 26 in association with its emitter resistor 28, and the zener diode 36.

By maintaining a +12 volt potential at the anode of the diode 16, it is possible to prevent the transistor 8 from attaining a saturated condition which would require additional time to ready the system for a subsequent operational cycle. During the application to an input stage of a binary zero signal, the diode 14 is reverse-biased, thus causing the related input stage to be effectively decoupled from the emitter of the transistor 22.

Upon the application of a binary one signal, i.e., a signal approaching ground potential, to a converter input stage such as the input stage $S_1$, the following action takes place. With a ground potential signal applied to the input terminal 1′, the base-emitter junction of the input transistor 8 becomes reverse-biased to render the latter non-conductive. Its collector now goes positive towards B+ potential and forward-biases the diode 14. Current is now routed via the positive source B+ and resistor 12 through the coupling diode 14 to the emitter of the transistor 22. Similarly, each of the input stages which also have a binary one input signal coupled thereto contribute an additional increment of current to the current summing transistor 22, while those stages which are receiving a binary zero signal remain decoupled from the current summing transistor 22 and provide no incremental current contribution to the latter.

The current contribution from each of the digital input stages increases the conduction of the transistor 22 and thereby increases the voltage drop across its collector resistor 42. This voltage drop, in turn, increases the conduction of the transistor 48 which provides isolation of the analog voltage signal appearing across the resistor 42 from the circuit load impedance. The adjustable emitter resistor 50 provides a means for adjusting the rate of current compensation provided by the circuit for each additional increment of digital input current. The resistor 46 is of a low ohmic value and serves to prevent parasitic oscillations from being generated within the circuitry of transistor 48, while the presence of a diode 44 compensates for the initial threshold of conduction associated with the base-emitter junction of transistor 48.

Figure 2B:
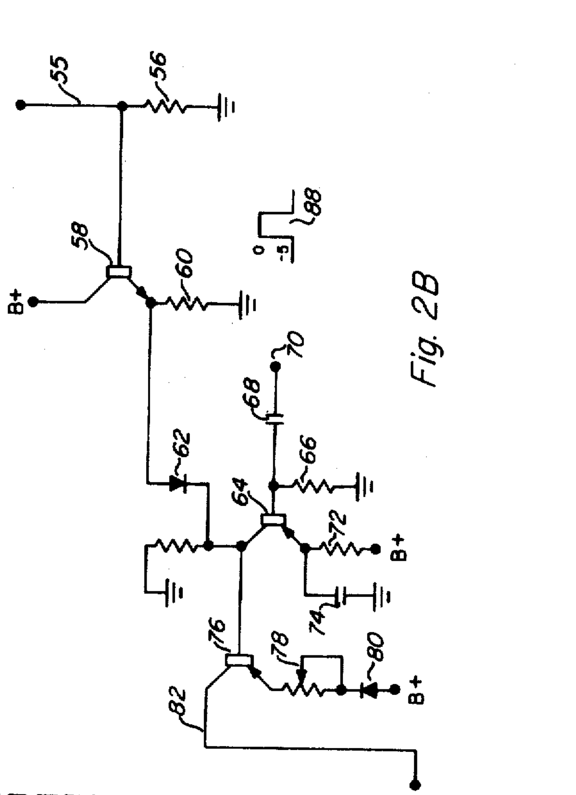
FIGURE 2B illustrates a preferred embodiment of the word current generator of the present invention.

The proportional control voltage formed at the collector of transistor 48 is now coupled via the output lead 54 to the input lead 55 of the word current generator circuit of FIGURE 2B. The resistor 56 of FIGURE 2B serves to adjust the voltage level coupled to the base of a transistor 58 to a desired value. The transistor 58 serves as an emitter follower and has its collector connected to B+ potential and its emitter connected via the resistor 60 to ground. The emitter of transistor 58 is further connected to the anode of a clamp diode 62, the latter having its cathode connected to the collector of a driver transistor 64. The base of transistor 64 is connected to one lead of a resistor 66 and of a condenser 68, the latter having its other lead coupled to a gate input terminal 70. The other lead of resistor 66 is returned to ground while the emitter of transistor 64 is returned to B+ potential via a resistor 72, and to ground via a decoupling condenser 74.

Figure 2C:
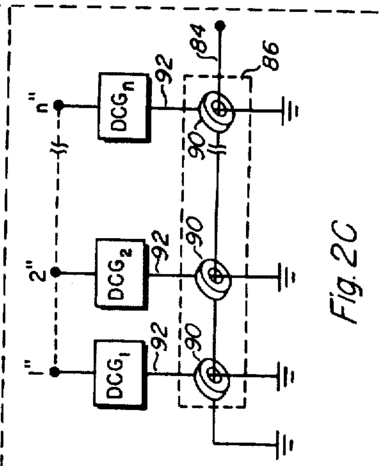
FIGURE 2C illustrates selected ones of the digit current generators and a selected portion of the memory array of the present invention.

The collector of driver transistor 64 is directly connected to the base of the current generator transistor 76, the latter having its emitter returned to B+ potential via the series connected adjustable resistor 78 and diode 80. The collector 82 of transistor 76 is routed by suitable word line selection circuitry such as the word selection circuitry F of FIGURE 1, to a selected word line 84 of a magnetic core memory 86, shown in part in FIGURE 2C. The aforesaid word line selection circuitry, which functions as a signal routing device to select a desired location within the memory array 86, is conventional in construction and has, accordingly, been omitted in the FIGURE 2 drawings for the sake of clarity.

In operation, the word current generator driver transistor 64 is normally maintained in a conductive state because of the forward-biasing potential established between its base-emitter junction by way of a current path which includes the B+ source, emitter resistor 72, the base-emitter junction of transistor 64, and the resistor 66 to ground. The collector of transistor 64, therefore, approaches B+ potential, causing the current generator transistor 76 to be essentially nonconductive. This is the case since transistor 76 has its emitter connected to B+ potential and requires a forward-biasing potential across its oase-emitter junction of a magnitude sufficient to overcome the forward conduction threshold of the diode 80 connected in series with its emitter current path.

When a positive-going signal, such as that shown by the waveform 88, is applied to the gate input terminal 70, driver transistor 64 becomes temporarily nonconductive. Its collector electrode now goes in a negative at the level established by the clamp voltage which is applied to the anode of diode 62 from the digital-to-analog converter lead 54. This voltage may, for example, be of the order of +25 volts and will vary in accordance with the number of digital input signals applied to the input stages of the converter which are at the binary one level.

The decreased voltage level now formed on the collector of transistor 64, and coupled to the base of transistor 76, causes the latter to become conductive and provides a current pulse on its collector lead 82 whose magnitude is determined by the aforementioned clamp voltage in conjunction with the setting of the adjustable emitter resistance 78 and the B+ ptoential. As previously mentioned, the controlled magnitude current pulse is applied via selection circuitry coupled to the collector 82 to a selected memory word line such as the word line 84 associated with the magnetic core memory 86 of FIGURE 2C. The word line 84 threads a number of magnetic cores 90, which cores are also threaded by separate digit current lines 92. The digit current lines 92 are individually activated by their respectively ordered digit current generators $DCG_1$, $DCG_2$ . . . $DCG_n$, which generators provide a fixed value of partial select current through their related cores when their input leads 1″, 2″ . . . *n″* receive signals of a binary one value. These signals, as well as the signals applied to the digital-to-analog converter input terminals 1′, 2′ . . . *n′*, may be jointly received from a temporary storage register, such as the register A of FIGURE 1.

Thus, the memory system which forms the subject matter of the present invention, is capable of providing a switching current in a selected word line, the amplitude of which is dependent upon the number of cores linked by the line which are to be switched from a binary zero to a binary one state. The proper value of switching current is established by providing a current control signal whose amplitude varies in accordance with the number of binary one digits to be stored in the selected magnetic core word line. In addition, means are provided to control the rate of incremental switching current increase with respect to the number of additional cores to be simultaneously switched to the binary one state. By varying the switching current in accordance with the information content of the memory word, a fixed value of flux is established in the switched cores so that read-out signals of a constant amplitude are obtained.

While in accordance with the provisions of the statutes there has been illustrated and described the best form of the invention known, it will be apparent to those skilled in the art that changes may be made in the apparatus described without departing from the spirit of the invention as set forth in the appended claims, and that in some cases, certain features of the invention may be used to advantage without a corresponding use of other features.

Having now described the invention, what is claimed as new and novel, and for which it is desired to secure Letters Patent is:

1. In combination, digital-to-analog signal conversion apparatus, means coupling binary information to be stored in said memory system to said conversion apparatus, said conversion apparatus being adapted to form at its output a signal whose amplitude is a function of said binary information, a word-organized magnetic core memory having a plurality of word windings each of which link a number of cores in said memory, each of the cores linked by a common word winding being further linked by a different one of a plurality of digit windings, means for applying said binary information to said digit windings, and means for coupling the output signal from said signal conversion apparatus to a selected one of said plurality of word windings.

2. In a magnetic core memory system, digital-to-analog signal conversion apparatus, means coupling binary information to be stored in said memory system to said conversion apparatus, said conversion apparatus being adapted to form at its output a signal whose magnitude is a function of said binary information, a magnetic core memory having a plurality of first windings each of which thread a number of cores in said memory, each of the cores threaded by a common first winding being further threaded by a different one of a plurality of second windings, means for applying said binary information to different ones of said second windings, and means for coupling the output signal from said signal conversion apparatus to a selected one of said plurality of first windings; whereby the magnitude of the current applied to the selected first winding varies in accordance with said binary information.

3. In a memory system, digital-to-analog signal conversion apparatus, means for coupling a plurality of binary digital signals to be stored in said memory system to said conversion apparatus, said conversion apparatus being adapted to form at its output a signal whose magnitude is dependent upon the number of said digital signals which exist at a selected binary value, a core memory having a plurality of drive windings each of which links a number of cores in said memory, and means for coupling the output signal from said signal conversion apparatus to a selected one of said plurality of drive windings.

4. In combination, digital-to-analog signal conversion apparatus, means for coupling a plurality of binary digital signals to said conversion apparatus, said conversion apparatus being adapted to form at its output a signal whose magnitude is dependent upon the number of said digital signals at a selected one of their binary values, a memory having a plurality of control leads each of which controls the activation of a number of bistable memory elements, and means responsive to the output signal from said signal conversion apparatus for energizing a selected one of said plurality of control leads.

5. In combination, a compensation circuit comprising means for receiving binary multidigit information, means for deriving a signal having an amplitude which is a function of the number of binary ONE's in said multidigit information, a plurality of bistable elements organized into predetermined groups, and means for energizing a selected one of said groups with said signal.

6. In a magnetic core memory system, register means adapted to store binary information, digital to analog signal conversion apparatus, means for coupling the binary information stored in said register means to said conversion apparatus, said conversion apparatus being adapted to form at its output a signal whose amplitude is a function of said binary information, a word-organized magnetic core memory having a plurality of word windings each of which thread a number of cores in said memory, each of the cores threaded by a common word winding being further threaded by a different one of a plurality of digit windings, means for applying said binary information to different ones of said digit windings, and means responsive to the output signal of said signal conversion apparatus to energize a selected one of said plurality of word windings with a current that varies in amplitude in accordance with said binary information.

7. In a magnetic core memory system, register means adapted to store a multidigit binary number applied to said system, digital to analog signal conversion apparatus, means for coupling the binary number stored in said register means to said conversion apparatus, said conversion apparatus being adapted to form at its output a signal whose magnitude varies in accordance with the information content of said multidigit binary number, a word-organized magnetic core memory having a plurality of word windings each of which thread a number of cores, each of the cores threaded by a common word winding being further threaded by a different one of a plurality of digit windings, means for applying the binary digits of said multidigit binary number to different ones of said digit windings, and means for coupling the output signal from said signal conversion apparatus to a selected one of said plurality of word windings; whereby a current pulse is applied to the selected word winding whose amplitude varies in accordance with the information content of said applied multidigit binary number.

8. In a magnetic core memory system, register means adapted to store the binary digits of a multidigit binary number applied to said system, digital to analog signal conversion apparatus, means for coupling the binary digits stored in said register means to said conversion apparatus, said conversion apparatus being adapted to form at its output a signal whose magnitude varies in accordance with the number of binary digits applied thereto which are at a selected one of their binary values, a word-organized magnetic core memory having a plurality of word windings each of which thread a number of cores equal in number to the binary digits in said multidigit binary number, each of the cores threaded by a common word winding being further threaded by a different one of a plurality of digit windings, means for applying the binary digits of said multidigit binary number to different ones of said digit windings, and means for coupling the output signal from said signal conversion apparatus to a selected one of said plurality of word windings; whereby the amplitude of the current applied to the selected word winding varies in accordance with the binary values of said applied multidigit binary number.

9. In a magnetic memory system, a storage register adapted to store a binary multidigit signal, a digital-to-analog signal conversion circuit, means for simultaneously applying the digits of said stored multidigit signal to said conversion circuit, said conversion circuit being adapted to provide a responsive output signal of an amplitude dependent on the number of digits in the applied signal which have a predetermined binary value, a word-organized magnetic core memory having a plurality of groups of bistable cores, the cores of each of said groups being threaded by a common word winding and corresponding respectively to a separate digit of said multidigit signal, each core in a group being further threaded by a separate digit winding, a first drive current generator adapted to simultaneously energize said digit windings in response to said stored multidigit signal, a second drive current generator connected to the output of said conversion circuit, and means for applying the output signal of said second drive current generator to a selected one of said word windings; whereby the amplitude of the drive current applied to said selected word winding varies in accordance with the binary values of the digits in said multidigit signal.

10. The apparatus of claim 9 wherein said digital-to-analog signal conversion circuit includes a plurality of transistor input stages each adapted to receive at its input a digit of said multidigit signal, each of said input stages having its output coupled to a common junction point, a current summing transistor stage having its input coupled to said junction point, an output transistor having a base, an emitter, and a collector, means coupling the output of said current summing transistor stage to the base of said output transistor, an adjustable resistor connected between the emitter of said output transistor and ground, and means coupling the collector of said output transistor to said second drive current generator, said output transistor being adapted to provide a value of output current with respect to its input current dependent on the setting of said adjustable resistor.

11. The apparatus of claim 9 wherein said second drive current generator includes a driver transistor stage having a base, an emitter, and a collector, means for providing a forward biasing potential across the base-emitter junction of said driver transistor to render the latter normally conductive, means for coupling a clamping voltage to the collector of said driver transistor, said clamping voltage having a value determined by the output signal of said conversion circuit, a driven transistor having a base, an emitter and a collector, said driven transistor having its base connected to the collector of said driver transistor, resistor means connected in series with the emitter of said driven transistor, and means for applying a gating signal to the base of said driver transistor to render the latter nonconductive; whereby said driven transistor provides a current pulse at its collector whose amplitude is determined by the value of said resistor means and the value of said clamping voltage.

References Cited

UNITED STATES PATENTS 3,024,454 3/1962 Chaimowicz ---------- 340—347

ROBERT C. BAILEY, *Primary Examiner.*

G. SHAW, *Assistant Examiner.*